(12) United States Patent
Hoopengarner

(10) Patent No.: US 7,065,895 B2
(45) Date of Patent: Jun. 27, 2006

(54) ILLUMINATED TAPE MEASURE

(76) Inventor: Paul Hoopengarner, 4423 Bridge Field Rd., W. Dr., Plainfield, IN (US) 46168

( * ) Notice: Subject to any disclaimer, the term of this patent is extended or adjusted under 35 U.S.C. 154(b) by 0 days.

(21) Appl. No.: 10/929,617

(22) Filed: Aug. 30, 2004

(65) Prior Publication Data

US 2006/0042111 A1 Mar. 2, 2006

(51) Int. Cl.
*G01B 3/10* (2006.01)
*G01D 11/28* (2006.01)

(52) U.S. Cl. .............................. 33/760; 33/769; 33/771; 362/29; 362/119

(58) Field of Classification Search .................. 33/755, 33/759, 760, 761, 769, 771; 362/253, 84, 362/119, 120, 29
See application file for complete search history.

(56) References Cited

U.S. PATENT DOCUMENTS

| | | | |
|---|---|---|---|
| 1,643,166 A | 9/1927 | Martin | ........................ 33/759 |
| 1,750,370 A | 3/1930 | Straus | |
| 1,936,998 A | 11/1933 | Summers | |
| 2,804,538 A | 8/1957 | Leone | |
| 2,992,487 A | 7/1961 | Miller | |
| 4,242,574 A | 12/1980 | Grant | |
| 4,462,160 A | 7/1984 | Cohen et al. | |
| 4,516,325 A | 5/1985 | Cohen et al. | |
| 4,574,486 A | 3/1986 | Drechsler | |
| 4,580,347 A | 4/1986 | McKnight | |
| 4,696,110 A | 9/1987 | Walker et al. | |
| 4,750,268 A | 6/1988 | Ravid | |
| 4,811,489 A | 3/1989 | Walker | ........................ 33/759 |
| 4,823,469 A | 4/1989 | Broselow | ..................... 33/760 |
| 4,944,097 A | 7/1990 | Kang | |
| 5,044,089 A | 9/1991 | Petkovic et al. | |
| 5,381,318 A | 1/1995 | Fang | ........................... 362/108 |
| 5,430,952 A | 7/1995 | Betts | |
| 5,448,837 A * | 9/1995 | Han-Teng | ..................... 33/761 |
| 5,544,420 A | 8/1996 | Choi | .......................... 33/760 |
| 5,884,408 A | 3/1999 | Simmons | ...................... 33/494 |
| 6,138,373 A * | 10/2000 | Mann | .......................... 33/766 |
| 6,237,243 B1 | 5/2001 | Cook | .......................... 33/770 |
| 6,898,866 B1* | 5/2005 | Weeks | ......................... 33/762 |
| 2003/0000099 A1 | 1/2003 | Wang | |
| 2003/0093913 A1 | 5/2003 | Odachowski | |
| 2003/0131491 A1* | 7/2003 | Weeks | ......................... 33/762 |
| 2004/0035012 A1* | 2/2004 | Moehnke et al. | ............. 33/494 |
| 2006/0042111 A1* | 3/2006 | Hoopengarner | .............. 33/760 |

FOREIGN PATENT DOCUMENTS

| | | |
|---|---|---|
| GB | 2 186 692 | 8/1987 |
| GB | 2 229 533 | 9/1990 |
| JP | 2001174202 A * | 6/2001 |
| JP | 2002-162201 | 6/2002 |
| JP | 2005091064 A * | 4/2005 |

\* cited by examiner

*Primary Examiner*—R. Alexander Smith
(74) *Attorney, Agent, or Firm*—Maginot, Moore & Beck

(57) ABSTRACT

An illuminated tape measure comprises a housing with an illuminable tape positioned in the housing. The illuminable tape is marked with a plurality of regularly spaced markings that form a linear measuring scale so the tape may be used as a measuring tape. The illuminable tape is made of an electroluminescent material operable to emit light when electrical power is provided to the material. A power source and an inverter are positioned in the housing for supplying power to the illuminable tape. The housing includes at least one wall having a transparent portion. Light from the illuminable tape may pass out of the housing through the transparent portion. In one embodiment, a mirror is provided in the housing for focusing the light within the housing into a light beam.

20 Claims, 4 Drawing Sheets

ILLUMINATED TAPE MEASURE

BACKGROUND

This invention relates generally to the field of hand tools, and particularly to hand-held tape measures.

Tape measures are an important tool used by craftsman, technicians, electricians, construction workers and homeowners on a daily basis to make distance measurements. To this end, tape measures typically include a housing and a retractable tape with a linear measuring scale of regularly spaced markings printed on the tape. Numerals are printed next to the regularly spaced markings to indicate a distance from the end of the tape.

Tape measures are sometimes used in low light conditions. For example, an electrician may need to take a measurement in a crawl-space, sub-flooring or attic where little light is present. In these situations, it is difficult to see the markings on the tape and take a measurement.

In an attempt to address problems associated with tape measures in low-light conditions, some tape measures provide a light mounted on the housing that shines on the tape. This light helps the user see the scale markings near the housing that indicate the total extended length of the tape. However, these tape measures present a few of their own problems and do not solve other problems associated with low-light conditions. For example, the light directed to the tape often results in glare reflected off the tape, making it difficult for the user to see the tape from certain angles. Therefore, it would be desirable to provide a tape measure that is operable to illuminate the tape without significant glare in low light conditions.

An additional problem with prior art tape measures that include a small light directed at the tape is that the user often desires additional light. In particular, the user of the tape measure is often interested in a larger amount of light directed to the work area instead of a small amount of light directed at the tape near the housing. Therefore, it would be desirable to provide a tape measure that is operable to provide a light along the length of the measuring tape and not at one location on the tape. In addition, it would be desirable to provide a tape measure that could also be used as a room light or a flashlight when the user needs additional amounts of light in the working space.

SUMMARY

An illuminated tape measure comprises a housing including a plurality of walls and an aperture for allowing passage of an illuminable tape through the aperture. The tape is an illuminable tape operable to emit light when electrical power is provided to the tape. The illuminable tape is made of strips of electro-luminescent material and includes a first side with a linear measuring scale of regularly spaced markings. A switch mounted on the housing is operable to provide power to the illuminable tape, causing the illuminable tape to emit light. At least one of the plurality of walls in the housing is comprised of a transparent material. Accordingly, a transparent portion is formed in the housing that allows light from within the housing to escape through the transparent material.

The illuminable tape further includes a first end positioned within the housing and a second end that is free to be pulled from the housing. The first end is secured to a spool within the housing and the tape is generally wound upon the spool. The second end of the tape includes an enlarged portion that is too large to pass through the aperture and remains on the exterior of the housing at all times. The illuminable tape is operable to pass through the aperture such that the second end of the illuminable tape extends from the housing and a substantial portion of the illuminable tape is outside of the housing. However, the spool is spring biased to rotate in a direction that winds the tape on the spool. Therefore, after a length of the illuminable tape is pulled from the housing, the spring biased spool rotates in a direction that retracts a substantial portion of the tape back into the housing and winds it on the spool.

In one embodiment, the illuminated tape measure comprises a mirror positioned within the housing. The mirror is arranged to reflect light through the transparent portion of the housing, and create a light beam that originates from the housing. A point source of light may also be provided within the housing in addition to the illuminable tape to provide extra intensity for the light beam.

DESCRIPTION

Figure 1:
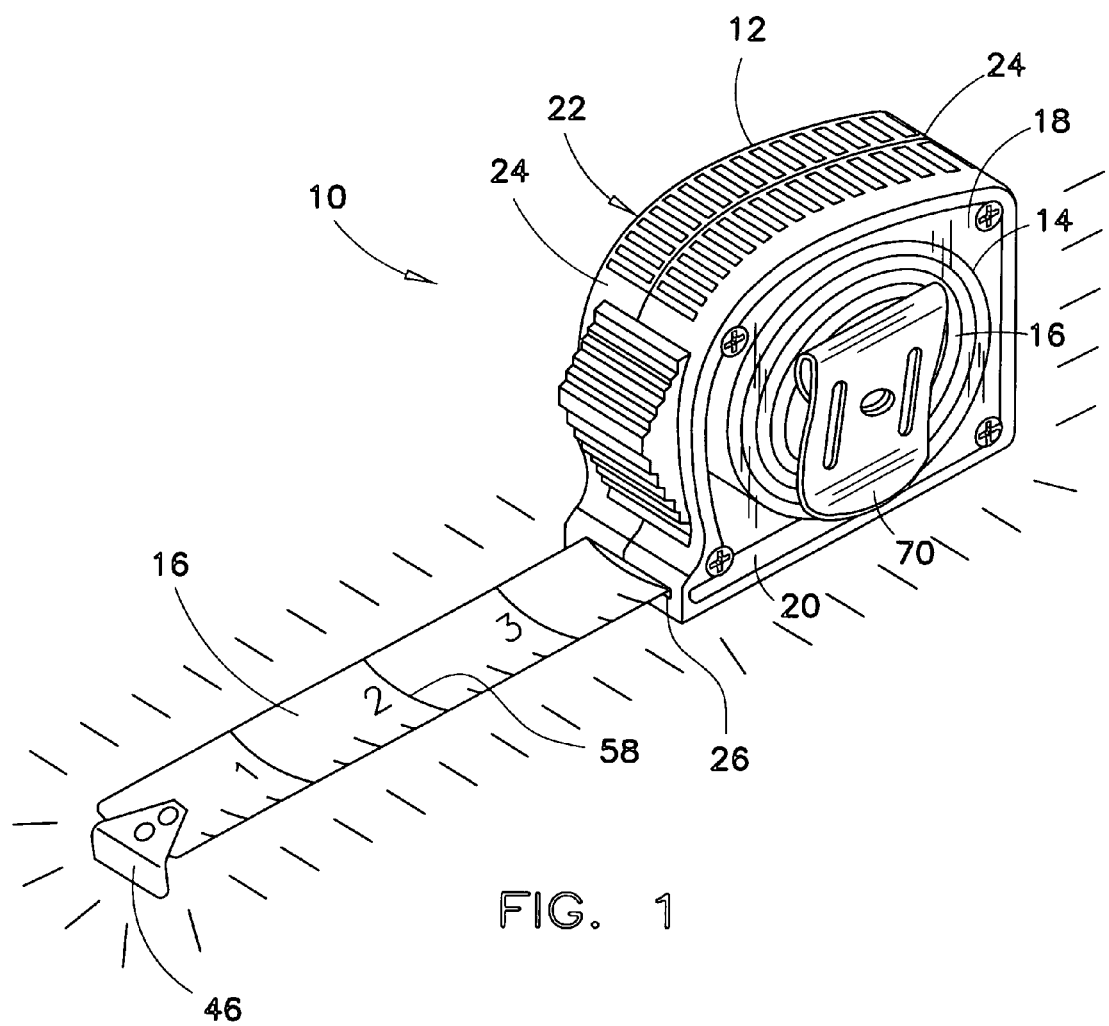
FIG. 1 shows a perspective view of one embodiment of an illuminated tape measure.

With reference to FIG. 1, an illuminated tape measure 10 comprises a housing 12 with a spool 14 rotatably mounted therein. A length of illuminable tape 16 is wound upon the spool 14. The illuminable tape 16 includes a linear measuring scale printed thereon. The illuminable tape 16 may be pulled from the housing to expose the linear measuring scale. The housing 12 includes a transparent portion 18 allowing light emitted from the illuminable tape 16 to escape the housing 12.

The housing 12 is sized such that it may be easily held in the hand of a human, as is typical with tape measures having tapes from ten to fifty feet. The housing is made of a plastic material, and is sufficiently durable to resist cracking or destruction when dropped on a concrete surface from a height of five to ten feet. Of course, the housing may be made of numerous other materials such as metal.

The housing 12 is a generally box-like structure comprising a plurality of walls. In particular, the housing includes a first sidewall 20 and a second sidewall 22 that is substantially parallel to the first sidewall. In one embodiment, the first and second sidewalls 20 and 22 are generally rectangular with curved perimeters, similar to the sidewalls in typical tape measures. However, the sidewalls may take the form of any number of different shapes. The sidewalls shown in FIGS. 1, 2, 4 and 6 are representative of some different shaped sidewalls. A connecting wall 24 joins the two sidewalls 20 and 22. The connecting wall is substantially perpendicular to the first sidewall 20 and the second sidewall 22 and extends between the two sidewalls. Accordingly, the connecting wall 24 forms a complete loop that follows the perimeter of the two sidewalls. An aperture 26 is formed in the housing 12 along the connecting wall 24. The aperture 26 is dimensioned to allow the illuminable tape 16 to pass through the aperture 26 as the user pulls the illuminable tape from the housing 12.

The housing includes a transparent portion 18 that allows light to pass through the housing 10. As shown in FIG. 1, the substantial portion of one sidewall 20 comprises the transparent portion. However, the transparent portion 18 may take a number of different shapes and/or include the entire housing structure or only a portion of the housing. For example, the transparent portion may be included on one sidewall, both sidewalls, and/or the connecting wall. In one embodiment, the transparent portion is comprised of a see-though material, such as a clear plastic. However, other materials may be used to form the transparent portion, such as glass. In one embodiment, the transparent material allows light of all wavelengths to pass through the material. In another embodiment, the transparent material is a translucent material that only allows light of a certain wavelength to pass through the material.

Figure 3:
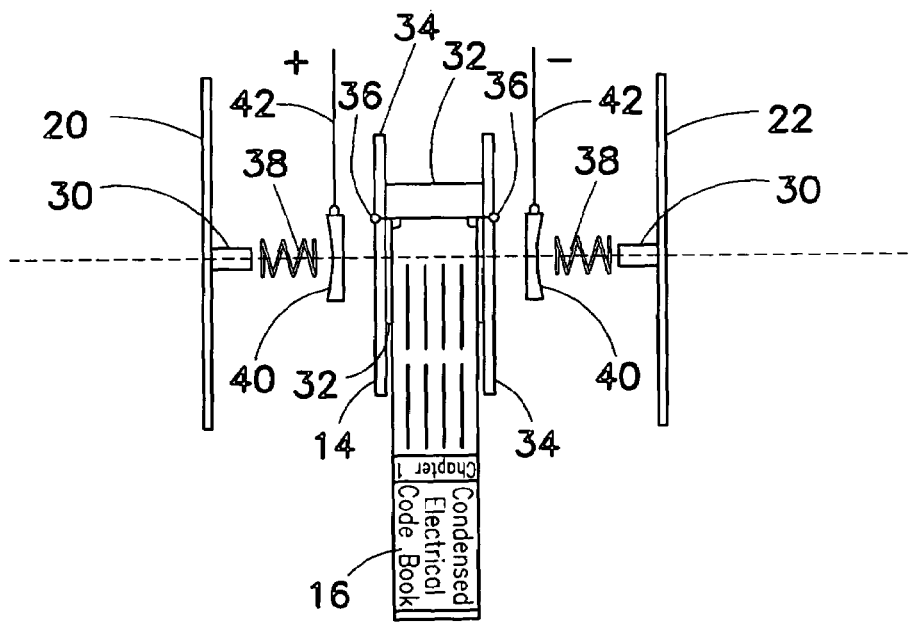
FIG. 3 shows an exploded assembly view of a spool and related components for mounting a tape in the illuminated tape measure of FIG. 1.

As shown in FIG. 3, the spool 14 is arranged on an axis 30 that extends across the center of the housing 12 from one sidewall 20 to the opposite sidewall 22. The axis 30 is stationary and passes through the center of the spool 14, allowing the spool to rotate upon the axis. The spool 14 includes a cylindrical winding surface 32 and two disc-shaped guide walls 34. The circumference of each guide wall 34 is greater than the circumference of the cylindrical winding surface 32. The cylindrical winding surface 32 is designed to receive the illuminable tape 16 so that it may be wound upon the spool 14, and the guide walls 34 are designed to retain the illuminable tape on the cylindrical winding surface. A coil spring 38 is provided between each side wall 20, 22 and each guide wall 34 on the spool. The coil springs 38 ride on the axis 30 and bias the spool 14 toward the center of the axis. A washer 40 is also provided between each coil spring 38 and each guide wall 34. The washers 40 are made of a conductive metallic material or include a conductive ring. Power wires 42 are connected to each washer 40.

The illuminable tape 16 is mechanically and electrically connected to the spool 14. In particular, one end of the illuminable tape 16 is physically joined to the cylindrical winding surface 32 using an adhesive or a mechanical fastener. In one embodiment, the cylindrical winding surface 32 includes a slot and the illuminable tape 16 is passed through the slot to further secure the tape to the spool. The illuminable tape is electrically connected to the spool by lead wires 36 that extend between the illuminable tape 16 and the guide walls 34. The guide walls 34 comprise a metallic material, allowing electrical current to flow across the guide walls and to the lead wires 36. On the other hand, the cylindrical winding surface 32 is comprised of a non-conductive plastic material that insulates the surface 32 from the guide walls 34.

With continued reference to FIGS. 2 and 3, and as described in further detail below, electrical power is delivered to the illuminable tape from a DC power source 50. The DC power source 50 is connected to an inverter which transforms DC into AC. The inverter is connected to the power wires 42. The power wires are electrically connected to washers 40 which contact the guide walls 34. In one embodiment, a brush (not shown) is provided on each washer 40, with each brush contacting a metallic ring on the guide walls 34, the guide walls otherwise being non-conductive. In another embodiment, a brush (not shown) is provided on each of the guide walls 34 and each brush contacts a metallic ring on the washer 40, with the guide walls being otherwise non-conductive. In any event, electrical power is passed through the stationary power wires 42 to the rotating spool 14 and on to the moveable illuminable tape 16 wound upon the spool. One of ordinary skill in the art will recognize that this electrical connection between moving and stationary parts may be achieved in a number of different ways.

The illuminable tape 16 comprises an electroluminescent material, such as the electroluminescent cell sold in strips under the name LUXLED®. The strips of electroluminescent material include electrodes that extend lengthwise along the sides of the strip. When an AC voltage source is applied across the electrodes, the strips of electroluminescent material emit light. In one embodiment, the illuminable tape is comprised of a base tape member that may be wound on a spool, but provides sufficient structure that it can extend several feet or meters from the housing without bending. Electroluminescent strips are then adhered to the front and/or back sides of the base tape member to provide a luminescent quality to the tape wherein the tape emits light when AC current is delivered to the tape. The tape provides a soft light along its entire length. This soft light is easy to look at and does not cause significant glare in the eyes of the user in low-light conditions.

As mentioned previously, the illuminable tape 16 is connected to the spool at one end, thereby keeping one end of the tape secured within the housing at all times. The opposite end or "free" end of the tape 16 is threaded through the aperture 26 in the housing 12. This end of the tape 16 is free to extend from the housing as additional lengths of tape unwind from the spool 14 and pass through the aperture to the exterior of the housing. When the illuminable tape 16 is fully extended from the housing 12, a substantial portion of the tape 16 is outside of the housing 12, but a small portion of the tape 16 is retained within the housing 12 near the end of the tape connected to the spool 14.

Figure 2:
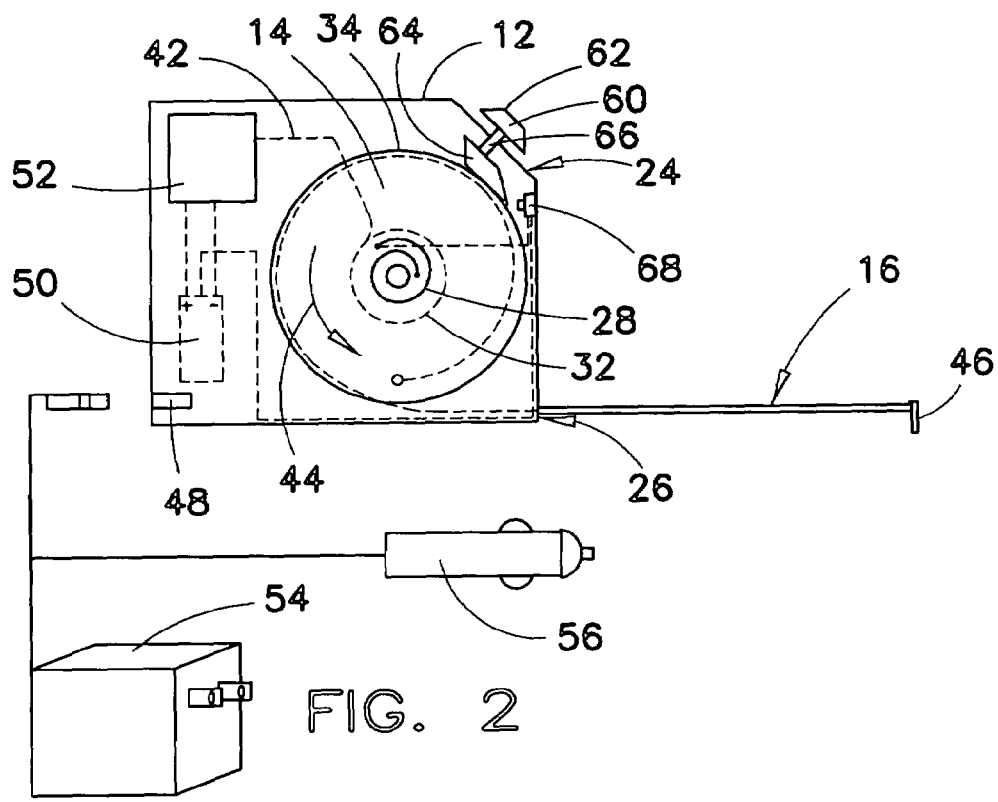
FIG. 2 shows a cross-sectional view of the internal components of the illuminated tape measure of FIG. 1.

As shown in FIG. 2, a wound spring 32 is connected to the spool. One end of the wound spring 28 is connected to the stationary axis and the opposite end of the wound spring is connected to the spool 14 near the cylindrical winding surface 32. When the tape 16 is pulled from the housing 12, the spool 14 rotates in the direction of arrow 44. Rotation of the spool 14 in this direction causes the wound spring 28 to compress and biases the spool 14 towards rotation in the direction opposite arrow 44. Accordingly, when the tape 16 is released, the spool 14 rotates opposite the direction of arrow 44 and the illuminable tape 16 is retracted back through the aperture 26. As the tape 16 is retracted back through the aperture 26, the tape is wound on the spool. When the tape 16 is fully retracted, a substantial portion of the tape 16 is retained within the housing 12. An enlarged portion 46 on the free end of the illuminable tape prevents the free end from retracting through the aperture 26 and into the housing. In one embodiment, the enlarged portion 46 is an actual portion of tape with an enlarged width. In another embodiment, the enlarged portion is a rigid material connected to the end of the tape with adhesives or mechanical fasteners. The enlarged portion may extend downward to allow the free end of the tape to be easily hooked on an object.

With continued reference to FIG. 2, the housing 12 also includes a DC power supply 50 in the form of a battery. The DC power supply 50 is situated in a battery compartment that is accessible through a battery door (not shown). The DC power supply 50 is connected to an encapsulated inverter 52 also mounted within the housing 12. The inverter 52 is operable to take the DC output of the battery and transform it into an AC output. The AC output of the inverter is then delivered to the illuminable tape through the power wires 42, as described above. In one embodiment, the housing includes a jack 48 for receiving power from an external DC power supply, such as an AC adaptor 54, or an automobile cigarette lighter adaptor 56.

As shown in FIG. 1, a linear measuring scale of regularly spaced markings 58 is printed on one side of the illuminable tape. The regularly spaced markings 58 are indicative of feet or meters or fractions thereof, such as inches or centimeters. Accordingly, the illuminable tape 16 is operable for use as a measuring tape. However, in an alternative embodiment, the opposite or "back" side of the illuminable tape includes information typically found in a reference source, such as the NEC code book or other industry information reference. In one embodiment, the first few inches of the back side of the tape includes an index of information provided on the tape and the foot or inch marker where the reference information may be found. In another embodiment, no index is provided on the back side of the tape, but the information provided on the tape is grouped with chapters in the reference book where the information is provided, and the grouped information corresponds by chapters to numerals on the front side of the tape measure. For example, information from chapter ten of the NEC code book is located on the back side of the tape at the location where the ten foot mark is on the front side of the tape. In another embodiment, the information on the back side of the tape is arranged such that more commonly used information is near the free end of the tape, and less commonly used information is near the opposite end of the tape.

Referring again to FIG. 2, a wheel lock/on-off switch 60 is provided on the connecting wall 24 of the housing 14. This switch 60 allows the user to manually lock the spool, thereby preventing the tape 16 from being pulled from or retracted back into the housing 12. At the same time, the switch 60 is operable to provide electrical power to illuminate the tape 16. In particular, the switch includes an exterior thumb pad 62 and an interior spool pad 64 with a shaft 66 extending in between. The shaft 66 rides in a slit in the connecting wall 24 of the housing 12 such that the switch 60 may be moved upward and downward along the slit. When the thumb pad 62 of the switch is in the upward (unlocked) position, the spool pad 64 is removed from the spool 14, allowing the spool to freely rotate. When the thumb pad 62 of the switch 60 is in the downward (locked) position, the spool pad 64 is in contact with the spool 14, prohibiting the spool from rotating. Also, when the thumb pad 62 is in the downward position, the spool pad 64 contacts a small pushbutton switch 68 mounted on the inside of the housing and depresses a pushbutton on the pushbutton switch 68. Depression of this push button connects the power supply 50 to the inverter 52 and causes electrical power to be provided to the illuminable tape 16. Therefore, when the switch 60 is in the downward (locked) position, the illuminable tape 16 is illuminated.

In one alternative embodiment of the invention, the power circuitry for the illuminable tape 16 may be configured to deliver power to the tape when the spool 14 rotates to a certain location, indicating that the user has pulled the tape from the housing 12 for use. For example, with reference to FIG. 2, the pushbutton switch may take the form of a sensor with a nearby tag placed on the spool. Movement of the tag past the sensor causes the sensor to energize, resulting in electrical power being delivered to the illuminable tape 16. With this embodiment, the illuminated tape 16 may be turned off automatically after a predetermined period of time. Of course, the tag and sensor combination may be any of a number of combinations known to those of skill in the art. For example, the sensor may be an optical sensor and the tag may be a bar code or other character recognizable by the sensor. As another example, the sensor may be a light beam broken by a physical tag on the spool. Of course numerous other arrangements are possible for the tag and sensor, including mechanical and/or magnetic sensors and associated tags. Furthermore, the on/off switch may take any number of different forms as will be readily apparent to one of skill in the art. For example, the on/off switch may be a completely separate mechanical switch provided on the exterior of the housing and located apart from the spool lock switch 60.

A clip 70 is provided on the sidewall 20 of the housing 12. The clip 70 is a standard belt clip often provided in association with tape measures that allows the tape measure to be retained upon a belt or other garment such as a pair of pants.

Figure 4:
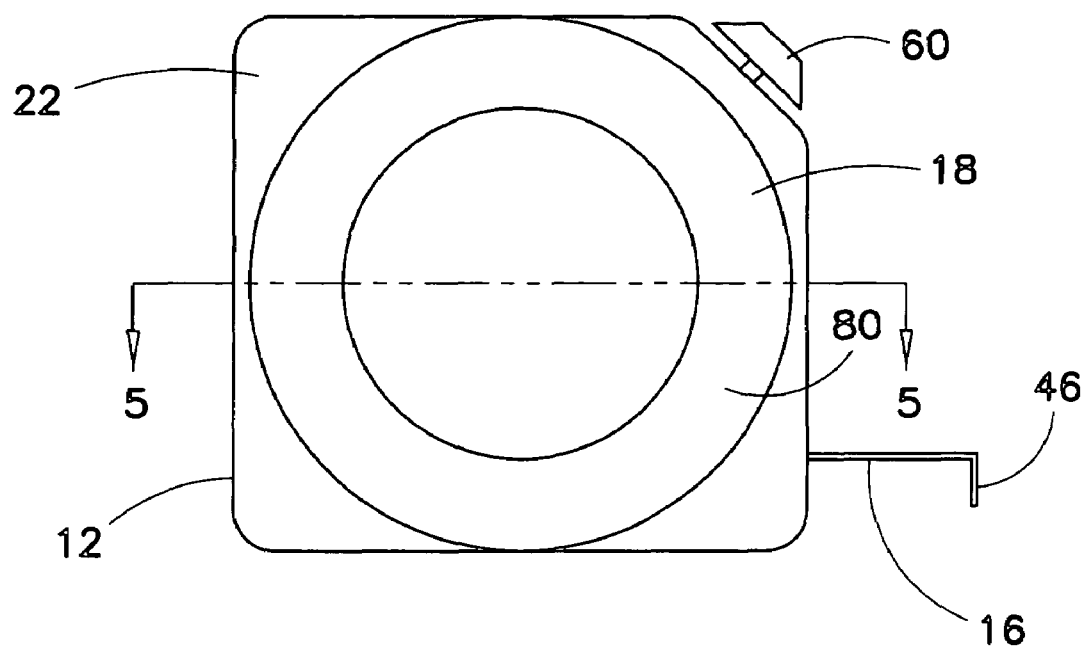
FIG. 4 shows a side elevational view of another embodiment of the illuminated tape measure of FIG. 1.
Figure 5:
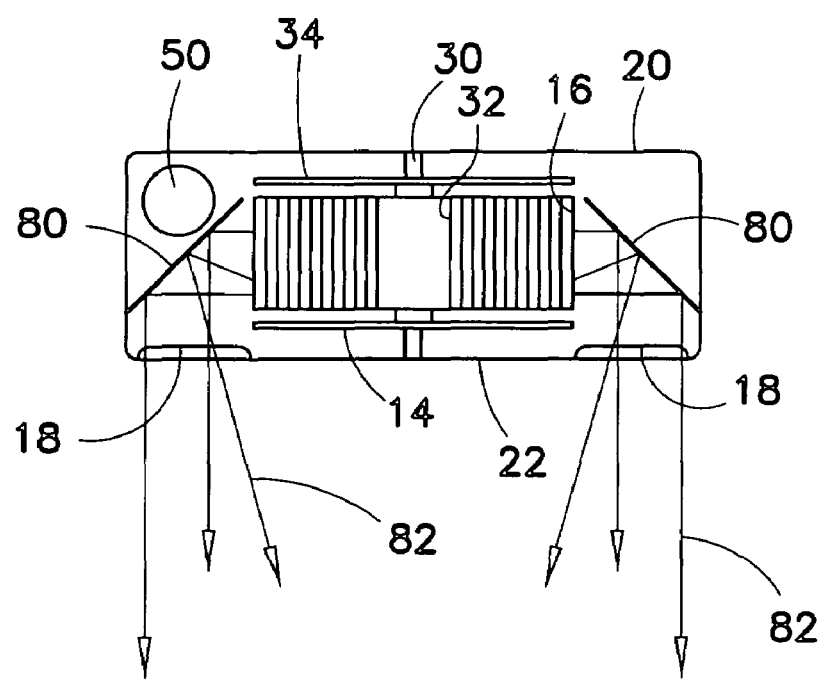
FIG. 5 shows a cross-sectional view of the illuminated tape measure of FIG. 4 along line 5—5.

With reference to FIGS. 4 and 5, an alternative embodiment of the invention is shown where a mirror 80 is positioned on the inside of the housing 12. The mirror 80 is frustum shaped, and is positioned concentric with the spool 14. At the same time, the mirror surface is arranged to reflect light emitted from the tape 16 wound on the spool 14 through the transparent portion 18 in a direction substantially perpendicular to the sidewall 22. A plurality of ray traces 82 are shown in FIG. 5 to depict the travel of light emitted from the tape through the transparent portion 18 and out of the housing 12. As shown in FIG. 4, the transparent portion 18 is in the form of a ring-shaped transparent member upon the sidewall 22. This ring-shaped transparent member 18 is arranged and dimensioned upon the sidewall 22 in the locations where light reflected from the mirror 80 will pass through the housing. The remainder of the sidewall 22 is opaque. In one embodiment, the transparent portion 18 may be manufactured of glass or plastic material and provide a lens having a given prescription to better focus the light passing through it into a desired beam pattern.

Figure 6:
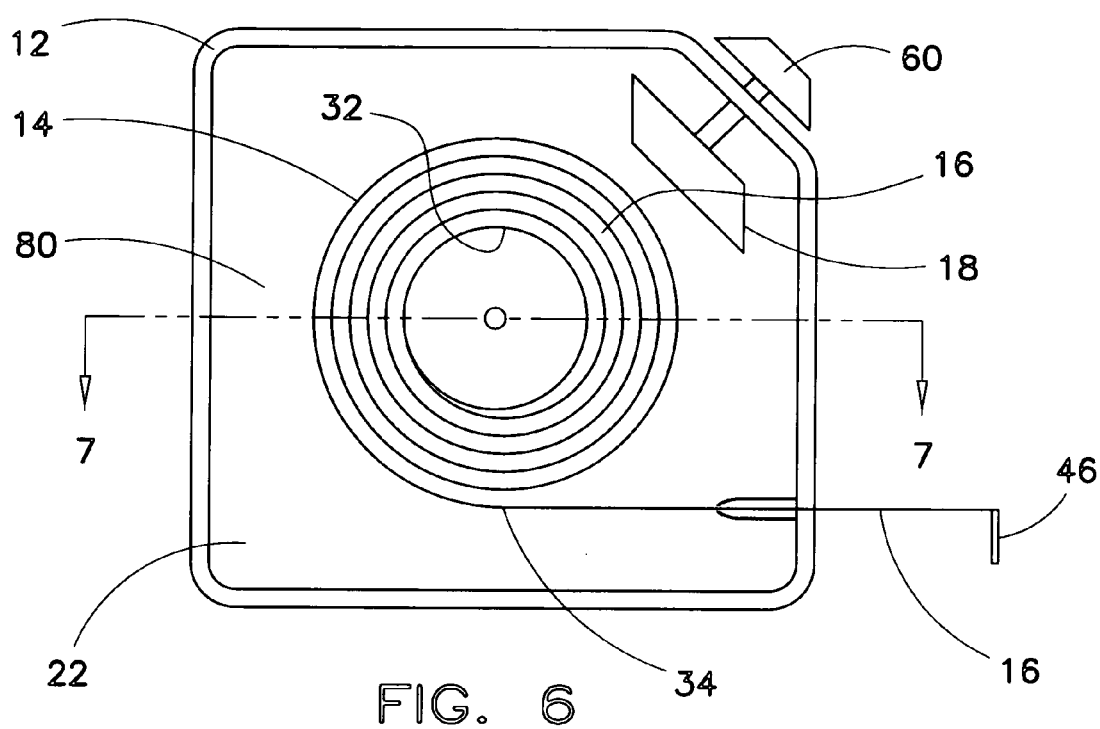
FIG. 6 shows a side elevational view of yet another embodiment of the illuminated tape measure of FIG. 1.
Figure 7:
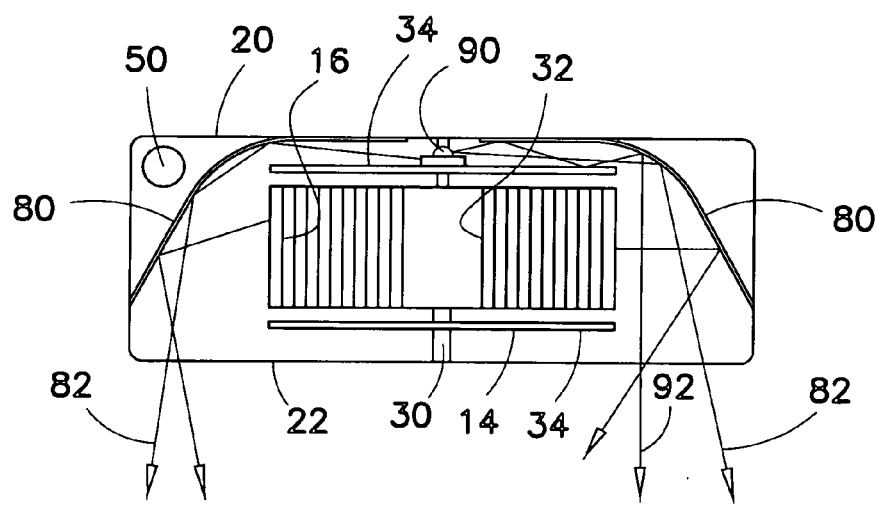
FIG. 7 shows a cross-sectional view of the illuminated tape measure of FIG. 6 along line 7—7.

With reference to FIGS. 6 and 7, another alternative embodiment of the invention is shown where a mirror 80 is included on the inside of the housing. As shown in FIG. 6, in this embodiment, the substantial portion of the sidewall 22 is transparent, thus exposing the spool 14 and illuminable tape 16. The remainder of the housing 12 is opaque. The guide walls 34 of the spool 14 are also transparent to allow additional light from the tape to escape the housing. The mirror is parabolic or hyperbolic in shape and wraps around behind the spool 14. The mirror reflects light from the tape 16 wound on the spool in a direction substantially perpendicular to the sidewall 22, as shown by ray traces 82. In addition, a point source of light is provided behind the spool 14. The point source of light may be any number of different types of light sources, such as incandescent light bulbs or light emitting diodes. The light source shown in FIG. 7 is a side-emitting LED 90 mounted on the guide wall 34. This additional light source provides additional intensity to the light beam reflected off the mirror 80 and through the sidewall 22. The side-emitting LED shines light on to the mirror 80, and the mirror in turn reflects this light out of the housing 12. To further encourage light from the LED to escape the housing 12, the guide wall 34 that faces the mirror 80 may include a reflective coating. This reflective coating reflects light that strikes the guide wall 34 back to the mirror 80 and eventually out of the housing, as shown by ray trace 92. Although the sidewall 22 is transparent, many of the components contained within the housing 12 may be hid from view behind the mirror 80. For example, the battery 50 and the inverter 52 are both hid behind the mirror 80.

In operation, the illuminated tape measure is particularly useful in low-light situations. The illuminated tape measure is conveniently carried on the belt of the user. Upon pulling the free end of the tape away from the housing, the tape illuminates, so the scale markings may be easily seen in low light. Alternatively, the user operates a switch to illuminate the tape. In certain situations, the illuminated tape measure may be used only for its light giving qualities. For example, if the user wishes to see down a dark and narrow corridor, the illuminated tape measure may be pushed down the corridor to provide a continuous light source down the corridor. Also, the light generated within the housing can provide a work light. For example, if the housing is mostly transparent, the illuminated tape measure provides a useful room light. If the illuminated tape measure includes a mirror that focuses the light within the housing, the illuminated tape measure provides a flash-light type light beam that is useful for focusing on a smaller area. Therefore, the illuminated tape measure provides a useful measuring tape and worklight combination. Additionally, industry reference information provided on the back side of the illuminated tape provides additional value to the user.

Although the present invention has been described with respect to certain preferred embodiments, it will be appreciated by those of skill in the art that other implementations and adaptations are possible. For example, photo-luminescent tape could be substituted for electroluminescent tape. As another example, the spool need not be spring biased, but could be controlled by a crank positioned on the outside of the housing that is operable to retract tape pulled from the housing back into the housing. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A tape measure comprising:
a housing including a plurality of walls, at least one of the plurality of walls comprised of a transparent material, the housing including at least one aperture;
an illuminable tape positioned within the housing and including a first side with a linear measuring scale of regularly spaced markings, the illuminable tape further including a first end positioned within the housing and a second end; wherein the illuminable tape is operable to pass through the at least one aperture such that the second end of the illuminable tape extends from the housing and a substantial portion of the illuminable tape is outside of the housing; and wherein the illuminable tape is further operable to be retracted back through the at least one aperture such that a substantial portion of the illuminable tape is enclosed within the housing and;
a switch, wherein the switch is operable in an on mode to allow electrical power to pass to the illuminable tape, and the switch is operable in an off mode to prevent electrical power from passing to the illuminable tape, and wherein the switch is placed in the on mode upon detection of movement of the tape relative to the housing.

2. The tape measure of claim 1 wherein the second end of the illuminable tape is enlarged to prevent the second end of the illuminable tape from passing through the aperture.

3. The tape measure of claim 1 wherein the plurality of walls include a first sidewall substantially parallel to a second sidewall, and a connecting wall, the connecting wall substantially perpendicular to the first sidewall and the second sidewall and extending between the first sidewall and the second sidewall.

4. The tape measure of claim 3 wherein the first sidewall, the second sidewall and the connecting wall are all comprised of a transparent material.

5. The tape measure of claim 1 further comprising a mirror positioned within the housing, the mirror arranged to reflect light through the at least one of the plurality of walls comprised of a transparent material.

6. The tape measure of claim 1 wherein the transparent material is a translucent material.

7. The tape measure of claim 1 wherein the regularly spaced markings are indicative of inches and feet.

8. The tape measure of claim 1 wherein the regularly spaced markings are indicative of centimeters and meters.

9. The tape measure of claim 1 wherein the illuminable tape includes a second side marked with a plurality of industry information references taken from an industry code book.

10. The tape measure of claim 9 wherein the first side of the illuminable tape includes a plurality of numerals indicative of either feet or meters.

11. The tape measure of claim 10 wherein the plurality of industry information references are grouped on the second side of the illuminable tape to correspond with chapters in which the references may be found in the industry code book, and the numerals on the first side of the tape correspond with the industry code book chapters on the second side of the tape.

12. The tape measure of claim 1 wherein the illuminable tape comprises an electro-luminescent strip.

13. The tape measure of claim 1 wherein the illuminable tape comprises a photo-luminescent strip.

14. The tape measure of claim 1 further comprising a battery positioned in the housing, the battery operable to provide electrical power to illuminate the illuminable tape.

15. The tape measure of claim 1 wherein the illuminable tape is wound within the housing on a spool, and wherein the switch is placed in the on mode upon detection of movement of the spool relative to the housing.

16. The tape measure of claim 15 wherein the spool includes at least one guide wall with a reflective surface.

17. A tape measure comprising:
a housing including a transparent wall portion;
an illuminable tape positioned within the housing, the illuminable tape including a first side with a linear measuring scale of regularly spaced markings; and
a mirror positioned within the housing, the mirror arranged to reflect light from the illuminable tape and through the transparent wall portion, wherein the transparent wall portion is arranged to allow light from the illuminable tape to pass through the housing.

18. The tape measure of claim 17 wherein the illuminable tape is wound in a coil within the housing and the mirror is cone-shaped and concentric with the wound illuminable tape.

19. The tape measure of claim 17 further comprising a point source of light positioned within the housing, the point source of light arranged to shine light on the mirror such that the light from the point source of light is reflected by the mirror and through the transparent wall portion.

20. A tape measure comprising:
   a housing including a plurality of walls, at least one of the plurality of walls comprised of a transparent material, the housing including at least one aperture;
   a spool mounted in the housing, the spool including at least one guide wall and a reflective surface; and
   an illuminable tape positioned within the housing on the spool, the illuminable tape including a first side with a linear measuring scale of regularly spaced markings, the illuminable tape further including a first end positioned within the housing and a second end; wherein the illuminable tape is operable to pass through the at least one aperture such that the second end of the illuminable tape extends from the housing and a substantial portion of the illuminable tape is outside of the housing; and wherein the illuminable tape is further operable to be retracted back through the at least one aperture such that a substantial portion of the illuminable tape is enclosed within the housing.

* * * * *